(12) United States Patent
Leibovich et al.

(10) Patent No.: US 7,981,456 B2
(45) Date of Patent: Jul. 19, 2011

(54) SOLID ALCOHOL PRODUCT AND PROCESS

(75) Inventors: Shai Leibovich, Eden Prairie, MN (US); Gal Motzaeli, Kiryat-Yam (IL)

(73) Assignee: AEGS Ventures, LLC, Hauppauge, NY (US)

( * ) Notice: Subject to any disclaimer, the term of this patent is extended or adjusted under 35 U.S.C. 154(b) by 0 days.

(21) Appl. No.: 12/218,658

(22) Filed: Jul. 17, 2008

(65) Prior Publication Data

US 2009/0148582 A1    Jun. 11, 2009

Related U.S. Application Data

(60) Provisional application No. 61/007,199, filed on Dec. 11, 2007.

(51) Int. Cl.
*A23L 3/36* (2006.01)

(52) U.S. Cl. .................... 426/524; 426/592; 426/573

(58) Field of Classification Search .................. 426/573, 426/524, 592
See application file for complete search history.

(56) References Cited

U.S. PATENT DOCUMENTS

| | | |
|---|---|---|
| 3,554,771 A | 1/1971 | Wiczer et al. |
| 3,843,809 A | 10/1974 | Luck |
| 4,790,999 A | 12/1988 | Ashmont et al. |
| 5,019,414 A | 5/1991 | Valdes |
| 6,403,140 B1 | 6/2002 | Tiainen et al. |
| 6,685,978 B1 * | 2/2004 | Hauksson ............ 426/573 |
| 6,737,098 B1 | 5/2004 | Devine et al. |
| 2003/0215548 A1 | 11/2003 | Mihajlovic |
| 2004/0253360 A1 | 12/2004 | Squicciarini |
| 2005/0260322 A1 * | 11/2005 | Takaichi et al. ............ 426/573 |
| 2008/0226777 A1 | 9/2008 | Helfend et al. |

OTHER PUBLICATIONS

Igoe et al Dictionary of Food Ingredients 3rd Edition, Chapman and Hall 1996, p. 18.*
Lenntech, Water Conductivity, pp. 1-2 http://www.lenntech.com/water-coonductivity.htm Dec. 9, 2006. Date obtained from http://web.archive.org.*
J. B. Hyne and R. M Levy, The Effect of Added Electrolyte on Hydrogen-Bonding Equilibrium in Dilute Solutions of t-Butyl Alcohol in Carbon Tetrachloride, Can. J. Chem. 40(4): 692-700 (1962), http://pubs.nrccnrc.gc.ca/cgibin/rp/rp2_abst_e?cjc_v62104_40_ns_nf_cjc).
PCT Int'l Preliminary Report on Patentability, May 13, 2009.

* cited by examiner

*Primary Examiner* — Kelly Bekker
(74) *Attorney, Agent, or Firm* — Henry J. Cittone; Cittone & Lindenbaum LLP

(57) ABSTRACT

A solid, edible ethanol containing product which may be either a rubbery solid or a hard solid that is frozen about 24.8° F. (−4° C.). The product contains gelatin and the ethanol may be provided in the form of selected alcoholic beverages.

3 Claims, No Drawings

SOLID ALCOHOL PRODUCT AND PROCESS

CROSS REFERENCE TO RELATED APPLICATION

This application claims priority from a provisional application filed Dec. 11, 2007 under Application No. 61/007,199 having the same title.

FIELD OF THE INVENTION

This invention relates to a method for making alcohol products that may range in consistency from a hard solid through sorbet-like at temperatures approximating the freezing point of water and to products that are a rubbery solid at room temperature. In addition, the invention relates to a solid ethanol product that, upon thawing, reverts to an ethanol containing solution that may be re-frozen.

BACKGROUND OF THE INVENTION

In the past, numerous attempts have been made to provide a frozen or solid ethanol product. However, a problem has been that very low temperatures have been required. For example, one approach is shown in U.S. Pat. No. 3,809,809 which discloses the combination of vodka or other alcoholic beverages with sodium metabisulfate and gelatin but, while esterification of ethanol in the presence of sodium metabisulfate is mentioned, a liquid product is not directly available because solidification is achieved by drying or vacuum dehydration whereas an object of the present invention is to preserve alcohol and water together in a solid.

In U.S. Pat. No. 4,790,999 to Ashmont, et al. a soft ice made from alcohol and sodium carboxymethyl cellulose is described but the end product is not hard, whereas another object of the present invention is to provide a whole spectrum of products with a consistency that ranges from hard frozen products through sorbet-like to gummy-like. All of these products rely on a single recipe, and the modulus, or degree of rigidity, of the final product is controlled through the weight ratio of additives that make up the recipe.

U.S. Patent Publication No. 2003/0215548 A1 to Mihajlovic discloses an ice cream that contains ethyl alcohol, gelatin, and sodium carboxymethyl cellulose. This publication mentions trapping microscopic portions of an ethyl alcohol/water solution in a tri-dimensional gel structure to reduce the interaction of ethyl alcohol with milk proteins and flavors in ice cream so that the flavor and aroma of the ice cream are preserved. However, an object of the present invention is to provide a hard, solid ethanol product or a sorbet-like ethanol product without an ice cream mix.

In U.S. Patent Publication No. 2004/0253360 A1 to Squireiarini, a hard frozen food containing alcohol and pectin as the gelling agent is disclosed. However, significant dilution with water is described and a freezing temperature of −20° F. is employed, whereas an object of the present invention is to avoid dilution and achieve freezing at temperatures close to the freezing point of water.

The foregoing and other objects are achieved by the present invention which is described below.

SUMMARY OF THE PRESENT INVENTION

The present invention is directed to freezing a mixture or solution that contains a drug for example, alcohol, at temperatures higher than it would be expected that the mixture would freeze. In one aspect of the invention, specific food additives are introduced into an existing brand of alcoholic beverage. Upon addition of said additives, the beverage may be frozen in a freezer at temperatures as high as negative four (−4)° C. (24.8° F.), which is readily accomplished in household refrigeration now in use. The drug may be any chemical but preferably, it may be ethanol. The commercial applications are numerous. For instance, producers of alcoholic beverages may increase their brand strength by introducing a frozen version of their product, particularly, the increasingly popular flavored alcoholic beverages.

In another aspect, the invention is a process including the steps of purifying a quality of water until the conductivity is lower than 20 mS/m; heating the water to 55° C., dissolving agar and/or a gelatin in the water while vigorously the water and allow 10 to 15 minutes between successive additions, adding sodium metabisulfite to said mixture, and adding an alcoholic beverage; cooling the mixture to room temperature and letting it stand for at least four hours, and freezing the mixture at 24.8° F. or lower to form a solid product containing ethanol.

In a further aspect, the present invention is a process comprising the steps of: mixing gelatin and/or agar with warm water; adding sodium metabisulfite if necessary; cooling the solution to room temperature; and adding any alcoholic beverage; where mixing should take place while any component is added to the mixture; and freezing the mixture, preferably at or above 24.8° F. Freezing can be at a lower temperature but is not generally required.

In a further aspect, the invention is a process comprising the steps of: heating a quantity of an alcoholic beverage; adding gelatin and/or agar to the heated alcoholic beverage; stirring and heating until the gelatin and/or agar is dissolved; adding pre-dissolved sodium metabisulfite (a requirement in this case); and allowing the mixture to solidify at room temperature.

In a further aspect, the invention is a process comprising the steps of: heating a quantity of an alcoholic beverage; adding gelatin and/or agar to the heated alcoholic beverage; stirring and heating until the gelatin and/or agar is dissolved; adding pre-dissolved sodium metabisulfite if necessary; allowing the solution to cool to room temperature; keeping it at room temperature for at least four (4) hours and; freezing the mixture to become a hard solid or a sorbet like product or any degree of rigidness within this range.

In yet another aspect, the invention is a process comprising the steps of: mixing gelatin and/or agar and/or other gelling agent with warm water or alcoholic beverage until the gelling agent is thoroughly dissolved; adding sodium metabisulfite if necessary, edible acids and/or absorbing agents such as bentonite or silicone dioxide that have been dissolved in water or alcoholic beverage to the solution and mixing well; cooling the solution; adding an alcoholic beverage; allowing the mixture to remain at room temperature for at least four (4) hours and; freezing the mixture at about 24.8° F. or lower.

In addition, the process comprising the step of allowing the mixture to set at room temperature. Important ingredients in the resulting product are sodium metabisulfite (SM), an alcoholic beverage (AB), and a gelling agent (GA).

In addition, the process relies on a single recipe which allows one to obtain a frozen product, regardless of the alcoholic beverage which one is attempting to freeze.

Moreover, the invention allows one to determine the consistency of the final product. The rigidity of the final product may range from that of a hard frozen product to that of a sorbet. These products are frozen at negative four (−4)° C. A gummy-type product is also obtainable with no freezing required (i.e., at room temperature).

Furthermore, the process of obtaining a hard frozen product or a sorbet-like product, or any consistency within this range, is reversible. This means that one may thaw the frozen product and refreeze it. This is practically beneficial in the sense that the final product may be frozen at the point of sale rather than necessitating cooling during shipping. It could further be sold frozen, thaw, and turn into a solid again once frozen at the consumer's point of consumption.

In addition, the product has a shelf life of about 18 months without addition of a preservative and longer with the addition of a preservative. The shelf life depends on the concentration of preservative.

Moreover, the process for obtaining the unfrozen product is simple and short. The unfrozen final product may be obtained after about 25 minutes. The process may be carried out on a bench-top scale, such as that of a household kitchen, using a heating mantle, a handheld mixer and a cooking thermometer. It may also be carried out on an industrial scale, utilizing large-volume mixers with double-walled receptacles and temperature control units.

The final product retains the taste and flavor of the initial alcoholic beverage. Only the state of matter is changed upon introduction of the food additives.

DETAILED DESCRIPTION

In a more detailed description, attention will be directed specifically to ethanol which is produced in the process of fermentation. All spirits, wines, beers and other alcoholic beverages contain this chemical in various volume fractions. Aqueous solutions of alcohol (water+ethanol) freeze in a range of temperatures, ethanol-water solutions containing more than 40% ethanol by volume will not freeze in most household freezers unless they are designed to hold at 5° F. or lower. This phenomenon (the decrease in freezing point of the solution) is not the colligative freezing point depression (the similar phenomenon that is responsible for boiling point elevation and osmotic pressure that is experienced upon addition of, for example, salt to water). Pure ethanol, though its molecular weight is higher than that of water, freezes at a much lower temperature simply because hydrogen bonds do not play such an important role in the interactions among the ethanol molecules. The freezing point of the solution is then the result of thermodynamic mixing rules.

TABLE 1

Freezing points of solutions of water and ethanol (source - http://www.engineeringtoolbox.com/ethanol-water-d_989.html)

| | | % Ethanol Volume | | | | | | | | | | |
|---|---|---|---|---|---|---|---|---|---|---|---|---|
| | | 0 | 10 | 20 | 30 | 40 | 50 | 60 | 70 | 80 | 90 | 100 |
| Freezing Point | F. | 32 | 25 | 15 | 5 | −10 | −25 | −35 | −55 | −75 | −110 | −175 |
| | C. | 0 | −4 | −9 | −15 | −23 | −32 | −37 | −48 | −59 | −73 | −115 |

To overcome the effect that the addition of ethanol has on the freezing point of the solution, it has been found necessary to add a food additive that would introduce some chemical interaction with water and/or ethanol. This additional chemical interaction will induce freezing at elevated temperatures despite the presence of ethanol. Some examples of such additives and their predicted effects are:

I. Decrease the volume fraction of free ethanol in the solution in a reversible manner. If each additive molecule binds itself weakly to several ethanol molecules, the stated effect is achieved. If, upon melting in the mouth, the interactions between the additive and the ethanol are overcome by thermal energy, the ethanol is reintroduced into the solution. As an example, this could be done by adding either a macromolecule such as a poly-carbohydrate (e.g., agar, natural gum, carrageenan, pectin, cellulose and its various derivatives, konnyaku, etc.) or a polypeptide (e.g., gelatin, casein, whey, etc.). If the concentration of these additives is high enough, a gel is formed in the solution. This gel serves to both elevate the modulus of the solution and would interact with ethanol to decrease its volume fraction in solution. Achieving this effect is not restricted to the addition of a gelling agent. It has been shown that a polar electrolyte molecule interacts with several tert-butyl alcohol molecules via hydrogen bonds, functioning as nucleation centers for aggregates of alcohol molecules (J. B. Hyne and R. M. Levy, *The Effect of Added Electrolyte on Hydrogen-Bonding Equilibrium in Dilute Solutions of t-Butyl Alcohol in Carbon Tetrachloride*, Can. J. Chem. 40(4): 692-700 (1962). http://pubs.nrccnrc.gc.ca/cgibin/rp/rn2_abst_e?cjc_v62104_40_ns_nf_cjc). The benefits of such an effect are threefold: In order to lower the effective concentration of free alcohol in solution, it is necessary to lower the mobility of the alcohol molecules, making them more susceptible to freezing and order is introduced lowering the entropy of the system. Finally, alcohol moieties are prone to react with acids under acidic catalysis (sulphuric acid is a common catalyst) to form esters. This condensation reaction is reversible. If additives are introduced that make this reaction favorable, they achieve the objective of reducing the volume fraction of free ethanol in the solution. Indeed, most esters are immiscible in water. This is advantageous in the sense that the ester actually precipitates out of solution. Since the esterification reaction is reversible, under the correct conditions (melting in the mouth), the ethanol may be reintroduced into the product.

When contemplating the possible interactions between ethanol and an additive, the following types of interactions may be projected:

A. Covalent bonding: As mentioned, the forming of ester moieties is the prevalent reaction.

B. Electrostatic interactions: These are unlikely as the pKa of ethanol is 16. That is, it is very weakly acidic. Hence, achieving dissociation of the alcoholic proton in an edible product seems unlikely. The high pKa is due to the unstable anion formed upon dissociation. For example, tert-butyl alcohol would have a significantly lower pKa due to stabilization of the negative charge by the tertiary carbon.

C. Hydrogen bonds: These are possible. This requires introduction of a food additive rich in hydrogen bond acceptors such as strong electrolytes or alcohol, carbonyl, ether or nitrogen-containing moieties.

D. Van der Walls interaction: These seem irrelevant to the present invention as they are too weak.

II. Introduce more order into the solution, as mentioned above. This decreases the initial entropy of the solution, bringing it closer to ordered state it would obtain upon freezing and should, in turn, decrease the energy threshold for the onset of crystallization. Two ways this may be achieved are by either causing aggregation of alcohol molecules due to hydrogen bonds with the additive or by introducing some food additive which requires hydration. The water molecules hydrating the additive molecules are either bound to them weakly or water forms a "cage" around them. A well-known effect that relies on this hydration is the hydrophobic effect, allowing micellization to occur in aqueous solutions. These cages may serve as seeds for further crystallization.

The first option (aggregation of alcohol molecules) has been discussed. Addressing the cage effect more specifically, it is known that water forms these highly ordered cages around the hydrophobic tails of surfactant molecules. It is also known that water hydrates hydronium ions with anywhere between 6 to 20 water molecules ties to a single hydronium ion. (http://en.wikipedia.orag/wiki/Hydronium).

III. Lower the energetic threshold for crystallization via enthalpic interactions. For example, if a food additive is introduced, which increases the ionic strength of the solution, the water molecules may interact more strongly with each other. This may stabilize the ice despite the presence of the alcohol.

IV. Draw the solution into a gel by way of osmotic pressure (swelling of a gel by a solvent), in essence fixing the alcohol inside the network. More specifically, this effect requires the introduction of a gelling agent at concentrations that would achieve a gel of a critical or higher or lower number of cross-links. Regardless of whether the additive has favorable or neutral interactions with water and alcohol, these would be drawn into the gel due to osmotic pressure. As previously mentioned, osmotic pressure is a colligative property, independent of the identity of the swelling agent. Of course, if the additive has favorable interactions with water and alcohol, i.e. it is charged or otherwise contains hydrogen bond acceptor moieties, then the chemical potential at standard state would dictate more swelling overall (it is the pressure difference between the standard state and the swelled state that is independent of the identity of the swelling agent).

This type of effect may, under certain circumstances, preclude the necessity to freeze the solution. That is, the solution is turned into a rubbery network at room temperature. The alcohol would be lost overtime to the surrounding via evaporation. This process should, however, be inhibited to some degree by the same considerations that cause the alcohol to be drawn into the network.

Turning now to a first embodiment of the invention, three additives are employed. The first additive is a gelling agent. Gelatin is in essence hydrolyzed collagen. It is a protein rich in glycine, praline and hydroxyproline amino acids. It is mainly the interactions between the latter two amino acids which allow gelatin to form triple helices, much in the same manner that DNA forms double helices. Upon heating in solution, the three helix strands dissociate, releasing the strands to become coils in solution. If the solution is then cooled, many strands will form triple helices again. However, the reformation of the helices is not perfect. This allows a physically cross-linked network to form in solution. It is believed that the gel formed in this matter would be superior to gels formed by macromolecules that exhibit weaker interaction such as poly-carbohydrates. The function of the additive should be to form a network via physical cross-links. The additive should contain many H-bond acceptor moieties to attract water and alcohol.

Collagen may be hydrolyzed to form gelatin by exposure to acid or alkali (http://www.gelatin.co.za/gltn1.html). The isoelectric point of the resultant gelatin (the pH at which there is no net charge on the chain) ranges from 7-9 for acid hydrolyzed (type A) to 4.7-5.4 for alkali hydrolyzed (type B). We discovered that alkali hydrolyzed gelatin (type B) is preferable, since the chain would have a net charge at pH values higher than its isoelectric point, which is rather low. This should be beneficial in attempting to associate the ethanol to the strands via H-bonds, as per clause 1 of the effect clauses above.

The second additive is a gelling agent as well. Agar (also known as agar agar) is a polysaccharide comprised of galactose, a hydroxyl-rich monosaccharide. Commercially, this additive is extracted from the cell membrane of algae. Generally, agar forms stronger gels than gelatin. It exhibits hysteresis in that its melting point in water is 85° C. versus a 32-40° C. temperature window for solidification. Commercially available agar may be found in one of three manifestations: agarose is the unmodified polysaccharide. Specifically, it is a linear chain comprising alternating D-galactose and 3,6-anhydrogalactose units, the former having three hydroxyl moieties and the latter having one hydroxyl group and one ether oxygen (a hydrogen bond acceptor). Due to its high pKa, it is generally electrostatically neutral. Since hydrogen bonds between hydroxyl moieties are not significant, this form of agar is not expected to add much enthalpic interaction with the ethanol in solution. Agaropectin is a linear chain of b-1,3-glycosidically linked D-galactose units. However, its hydroxyl moieties are modified to some degree to become acidic groups. Most commonly, they are sulfated. The presence of sulphuric acid catalyzes the esterification of ethanol in the presence of acids. This is beneficial in the context of this invention, as is discussed below. Overall, the presence of these groups adds a significant element of enthalpic interaction with the ethanol, either via covalent or hydrogen bonding. Agaropectin in itself is not sufficient in the context of this invention, as its gelling properties are much inferior to those of agarose. Pure agaropectin is in fact a non-gelling agent. The third manifestation is simply a mixture of agarose and agaropectin. The mixture usually comprises 30% agaropectin and 70% agarose. This mixture adds an element of gelling and an element of enthalpic interactions to achieve either covalent or hydrogen bonds with ethanol.

Agar in of itself is insoluble in ethanol. Hence, its use in this invention is limited to solubilization in water to form a gelling solution. This solution is then mixed with the alcoholic beverage to be frozen. Since agar is highly hydrophilic, a water/ethanol solution would swell the network formed by the polysaccharide. Approximately 1.5-2% of agar is necessary to arrive at the critical gel point in aqueous solutions.

The third additive is sodium metabisulphite. This is a preservative. Upon addition to aqueous solutions, it releases $SO_2$ and sulphuric acid is formed in the solution. While it lowers the pH of the solution, the dissociation of sulphuric acid introduces hydronium ions in the solution ($H_3O^+$). As previously stated, each hydronium ion requires 6 to 20 molecules of water to hydrate it. The water molecules form a dodecahedral cage around the ion. These cages introduce order into the solution. It is thought that the hydronium ion acts as an aggregation center for the alcohol. Moreover, sodium metabisulphite acts as a preservative. Addition of this agent allows one to store the final product for periods longer than 18 months. For periods of 18 months or less, the preserving aspect of this additive is unnecessary, as the presence of the alcohol is generally sufficient in this regard.

Naturally, in the presence of edible acids, sulphuric acid may catalyze the esterification of ethanol as previously stated. If the reaction favors the ester at low temperatures while it favors the alcohol and acid at warmer temperatures, it may serve the purpose of taking the ethanol out of solution while in the freezer, allowing water and the remaining ethanol in solution to freeze.

When adding gelatin in intermediate amounts, the resulting solution is a product with the consistency of a sorbet. The gelling agents form a physically cross-linked network with a mesh size that is big enough to allow crystallization of the water. The beverage swells this network, as previously described. To this mixture may be added various sugars, edible acids or various other additives. These may be added to modify such parameters as the modulus of the gel, its consistency, the vapor pressure of the liquid that swells the network, etc. The consistency, at this point, is not that of a hard frozen product, but rather that of a soft frozen product. However, when consumed, the alcohol effect is felt in the mouth.

When adding gelatin and/or agar in large amounts, the resulting solution is a "gummy" type product. The gelling agents form a densely physically cross-linked network. The beverage swells this network, as previously described. To this mixture may be added various sugars, edible acids or various other additives. These may be added to modify such parameters as the modulus of the gel, its consistency, the vapor pressure of the liquids that swell the network, etc. The consistency, at this point, is not that of a frozen product, but rather that of rubber. However, when consumed, the alcohol effect is felt in the mouth.

When adding smaller amounts of gelatin, it has been discovered that it is favorable to first allow the network to form (i.e., warm the gelatin and/or agar in water until fully dissolved and then allow the solution to cool for a while) to some degree before adding the alcoholic beverage.

The following list sets forth important parameters for the process:

1. The identity of the additives: agar and gelatin yield the best results as gelling agents. Sodium metabisulphite is the preferred preservative. However, many other gelling agents may be used as well. These are the food additives of the group E400-E499. (Codex Alimentarius)
2. The gel strength of the gelatin network is measured in bloom units. Different bloom values are the result of the mean molecular weight and the molecular weight distribution of the gelatin polypeptides. These are determined by several factors. Key among these is the duration of exposure of the collagen to the acid or alkali agents. The origin of the collagen (the tissue from which it is extracted, the types of collagen present in said tissue, the age of the animal, etc.) is also a key parameter. The higher the bloom strength of the gel, the lower the concentration of gelatin required to achieve the same gel strength, the correlation is given by: $C*\sqrt{B}$=const. C is the gelatin concentration and B is its bloom strength. Consequently, when one wishes to obtain the same gel strength at lower concentrations of the gelling agent, one must use a material with a higher mean molecular weight and with a smaller polydispersity index.
3. The identity of additives that serve to strengthen the network and adsorb ethanol and/or the gelling agent. These additives (e.g., silicone dioxide and bentonite) increase the gel modulus by forming physical cross-link sites, much in the same way that the addition of ash to strengthen polybutadiene and polyisoprene blends in making automobile tires, is crucial to make the tires adequate for use. This type of additive would allow using a lower concentration of the gelling agent. Concurrently, they might adsorb alcohol, thus reducing its fraction in solution until such time that the alcohol is desorbed.
4. The order in which the additives are added, e.g., when introducing edible acids and sodium metabisulphite to incorporate the alcohol into ester bonds, the catalyst needs to be added first to allow proper dissolution.
5. The temperatures at which the additives and alcoholic beverages are added.
6. The purity of water: It is preferred to use water of the highest purity. Water that is obtained through reverse osmosis having a conductivity of 20 mS or less is optimal for obtaining the best results, but water that passes through generally available home or industrial reverse osmosis appliances is acceptable.
7. Initial water temperature: The optimal temperature of the pure water to begin the process is 55° C. with a preferred range being 50° C. to 60° C.
8. Gel percentage: Preferably the gel percentage in the solution may range from below about 1.5% to about 4%.
9. Preservation: The preferred preservation is sodium metabisulphite but other preservatives may be substituted.

The following examples set forth preferred embodiments of the invention and represent the best mode; and the concentration of gelatin and/or agar in warm water (140° F.) can range from 3% to 30% depending on the application; and It is crucial that the water used to prepare the gelling solution be pure to a reasonable degree. As an example, water obtained via reverse osmosis exhibiting an electric conductivity of no more than 20 mS (milli-Siemens) was found to yield excellent results.

The solidified alcohol mixture/product (at below 24.8° F.) will melt slowly at room temperature and will dissolve completely. No phase separation occurs and samples could be re-solidified when placed back at T=24.8° F. (−4° C.).

Brand Name Beverages And Generic Beverages That Were Used for Final Products. These are

| | |
|---|---|
| 1. | Bacardi Rum |
| 2. | Jack Daniels |
| 3. | Tequila Cuervo |
| 4. | Absolute |
| 5. | Absolute Citron |
| 6. | Remy VSOP |
| 7. | Gin |
| 8. | Baileys |
| 9. | Bushmills Malt/Single Malt |
| 10. | Pina Colada |
| 11. | Irish Cream |
| 12. | Coccolo Pas |
| 13. | Quantro |
| 14. | Liqueur Apricot |
| 15. | Pizang |
| 16. | Screwdriver Cocktail |
| 17. | Margarita Cocktail |
| 18. | Black Russian Cocktail |
| 19. | Kahlùa Coffee Liqueur |
| 20. | Kahlùa Liqueur |
| 21. | Godiva Chocolate Liqueur |

EXAMPLE 1

One liter of pure water is heated to 55° C. (131° F.). While maintaining this temperature, the water is mixed at a high rate (i.e., 350 rpm and higher). As the warm water is mixed, 1.5% by weight of food-grade agar is added. The agar should be of the purest quality. Mixing should persist for at least 10 minutes while maintaining the temperature of the solution at 55° C. The steady shear viscosity of the solution should not be higher than 2000 cp (centi-poise), or 2 Pa*s (the steady shear viscosity of water is typically 1 cp, or 0.001 Pa*s). After 10 minutes have passed, and the solution is clear, indicating that the agar had completely dissolved in the water, 1½% by weight of food-grade gelatin selected from gelatin E400-449 in Codex Alimentarius and in which E441 is a preferred gelatin that is added while vigorously mixing the solution. The gelatin should be of the purest quality and produced from an animal source, preferably bovine. Mixing should persist for at least an additional 15 minutes while maintaining the temperature of the solution at 55° C. After 15 minutes have passed, and the solution is clear, indicating that the gelatin had completely dissolved in the water, sodium metabisulphite may or may not be added, according to the preferences of the user. The solution is passed through a 100-micrometer filter and is cooled to room temperature. The resultant gelling solution is gently mixed (about 35 rpm for duration of ten minutes) with the alcoholic beverage at a volume ratio of 1:1 or 2:1 alcoholic beverage: gelling solution to obtain roughly 23.6% and 37.8% that is about 24% to about 38% alcohol, respectively. Mixing should desist once the mixture seems to be completely liquid. About four (4) hours after the final product has reached room temperature, it may be placed in a freezer (T=24.8° F.) where it freezes solid. It could also be kept in its liquid state for freezing at a later time.

As mentioned above, any food additives may be used instead of or in addition to agar and gelatin. Food color agents, sugars and flavor enhancers could be added to this formulation while maintaining the same effect of solidifying the solution at ambient condition or using a household freezer. The foregoing ratios of ingredients in the mixture may be incorporated in larger or smaller batches.

This example yields better results when applied to the freezing of neat alcoholic beverages such as: vodka (Absolute, Absolute Citron), gin (Jean), whiskey (Jack Daniel's), brandy/Congac (Remy V.S.O.P.), rum (Bacardi).

EXAMPLE 2

One liter of pure water is heated to 55° C. While maintaining this temperature, the water is mixed at a high rate (i.e., 350 rpm and higher). As the warm water is mixed, four percent by weight of gelatin is added. Mixing should persist for at least 10 minutes while maintaining the temperature of the solution at 55° C. After 10 minutes have passed, and the solution is clear, indicating that the gelatin had completely dissolved in the water, sodium metabisulphite may or may not be added, according to the preferences of the user. The solution is passed through a 100-micrometer filter and is cooled to room temperature. The resultant gelling solution is gently mixed (about 35 rpm for a duration of ten minutes) with the alcoholic beverage at a volume ratio of 3:1 alcoholic beverage:gelling solution. The resultant solution is left to cool to room temperate. About four (4) hours after the solution has reached room temperature, it may be placed in a freezer (T=24.8° F.) where it freezes solid. It could also be kept in its liquid state for freezing at a later time.

This example yields better results when applied to the freezing of juice or cream containing alcoholic beverages, such as screwdrivers (alcoholic beverage consists of equal volumes of orange juice and vodka), margaritas (alcoholic beverage consists of equal volumes of juice and tequila), and black Russian (75% vodka and 25% Bailey's).

EXAMPLE 3

One liter of pure water is heated to 55° C. While maintaining this temperature, the water is mixed at a high rate (i.e., 350 rpm and higher). As the warm water is mixed, 4% by weight of gelatin is added. Mixing should persist for at least 10 minutes while maintaining the temperature of the solution at 55° C. After 10 minutes have passed, and the solution is clear, indicating that the gelatin had completely dissolved in the water, sodium metabisulphite may or may not be added, according to the preferences of the user. The solution is passed through a 100-micrometer filter and is cooled to room temperature. The resultant gelling solution is gently mixed (about 35 rpm for duration of 10 minutes) with the alcoholic beverage at a volume ratio of 5:2 alcoholic beverages:gelling solution. The resultant solution is left to cool to room temperate. About four (4) hours after the solution has reached room temperature, it may be placed in a freezer (T=24.8° F.) where it freezes solid. It could also be kept in its liquid state for freezing at a later time.

This example yields better results when applied to the freezing of creme-containing beverages, such as Bailey's Irish Cream.

EXAMPLE 4

Sorbet is a frozen dessert made from sweetened water flavored with iced fruit (typically juice or puree), chocolate, wine, and/or liqueur. The origins of sorbet can be traced to a Middle Eastern drink charbet, made of sweetened fruit juice and water.

A food of frozen fruit juice with or without a dairy product such as milk may be added; sorbet with or without dairy ingredients may be produced.

Sherbet as made in the United States includes dairy ingredients such as milk or cream to reach a milk fat content between 1% and 2%.

i.e—http://en.wikipedia.org/wiki/Sorbet

Pure water is heated to 70° C. While maintaining this temperature, the water is mixed at a high rate (i.e., 350 rpm and higher). As the warm water is mixed, one point sixty five (1.65) [16.5 gram per 1 liter final product]—percent by weight of gelatin is added. Mixing should persist for at least 5 minutes while maintaining the temperature of the solution at 80° C. After 5 minutes have passed, and the solution is clear, indicating that the gelatin has completely dissolved in the water, sodium metabisulphite may or may not be added, according to the preferences of the user. The solution is passed through a 100-micrometer filter and is cooled to room temperature while mixing. The resultant gelling solution is gently mixed (about 35 rpm for duration of ten minutes) with the alcoholic beverage at a volume ratio of 2:1 alcoholic beverage: gelling solution. The resultant solution may be placed in a freezer (T=24.8° F.) where it freezes. It could also be kept in its liquid state for freezing at a later time.

This example yields sorbet-like products. It works best with creme-based alcoholic beverages, such as Pina Colada, Irish Cream, Coccolo Pas, Quantro, Liqueur Apricot, Pizang, Kahlua Coffee Liqueur, Godiva Chocolate Liqueur, and any flavor alcoholic beverages.

It is possible to add fresh/preserved fruits to the final product.

While specific embodiments of our invention have been disclosed above, modification may become apparent to those skilled in the art, upon reading this specification, but our invention is limited only by the scope of the following claims.

We claim:

1. A process for preparing an edible, alcohol containing solution that will freeze into a homogenous hard solid at a temperature of about −4° C. and that after freezing may be thawed into a uniform, homogenous liquid without separation of the ingredients comprising the steps of:
   a) providing a quantity of water at a temperature of about 25° C.;
   b) heating and stirring said water at a first rate while adding agar until the agar content is in the range from about 1.5% by weight to about 4.0% by weight to create a gelling solution;
   c) continuing the heating and stirring of said solution until the gelling solution is in the range from about 50° C. to about 60° C.;
   d) maintaining the gelling solution in a temperature range from 50° C. to about 60° C. while stirring until the solution is clear indicating that the agar has dissolved; and, subsequently,
   e) continuing to stir the gelling solution at the first rate while adding gelatin until the combined weight of agar and gelatin is in the range of about 3% to about 30% by weight with the temperature of the solution continuing in the temperature range of about 50° C. to about 60° C.;
   f) maintaining the temperature and first stirring rate until the gelling solution is clear indicating the gelatin is dissolved;
   g) filtering and cooling the gelling solution to room temperature while continuing to stir at a second and lower rate;
   h) adding an ethanol containing beverage to form a solution of between about 24% and about 38% ethanol by volume and mixing until the solution becomes a homogenous liquid
   i) freezing the homogenous liquid at a temperature of about −4° C. to form a frozen homogenous hard solid.

2. The process of claim 1 wherein the first stirring rate is selected so that the agar will be dissolved within ten minutes and the second stirring rate is about 10% of the first rate.

3. The process of claim 1 wherein the first stirring rate does not cause the steady shear viscosity of the solution to exceed 2000 centi-poise.

* * * * *